No. 822,301. PATENTED JUNE 5, 1906.
F. J. REINHOLD.
BOX MAKING MACHINE.
APPLICATION FILED DEC. 21, 1899.
4 SHEETS—SHEET 1.
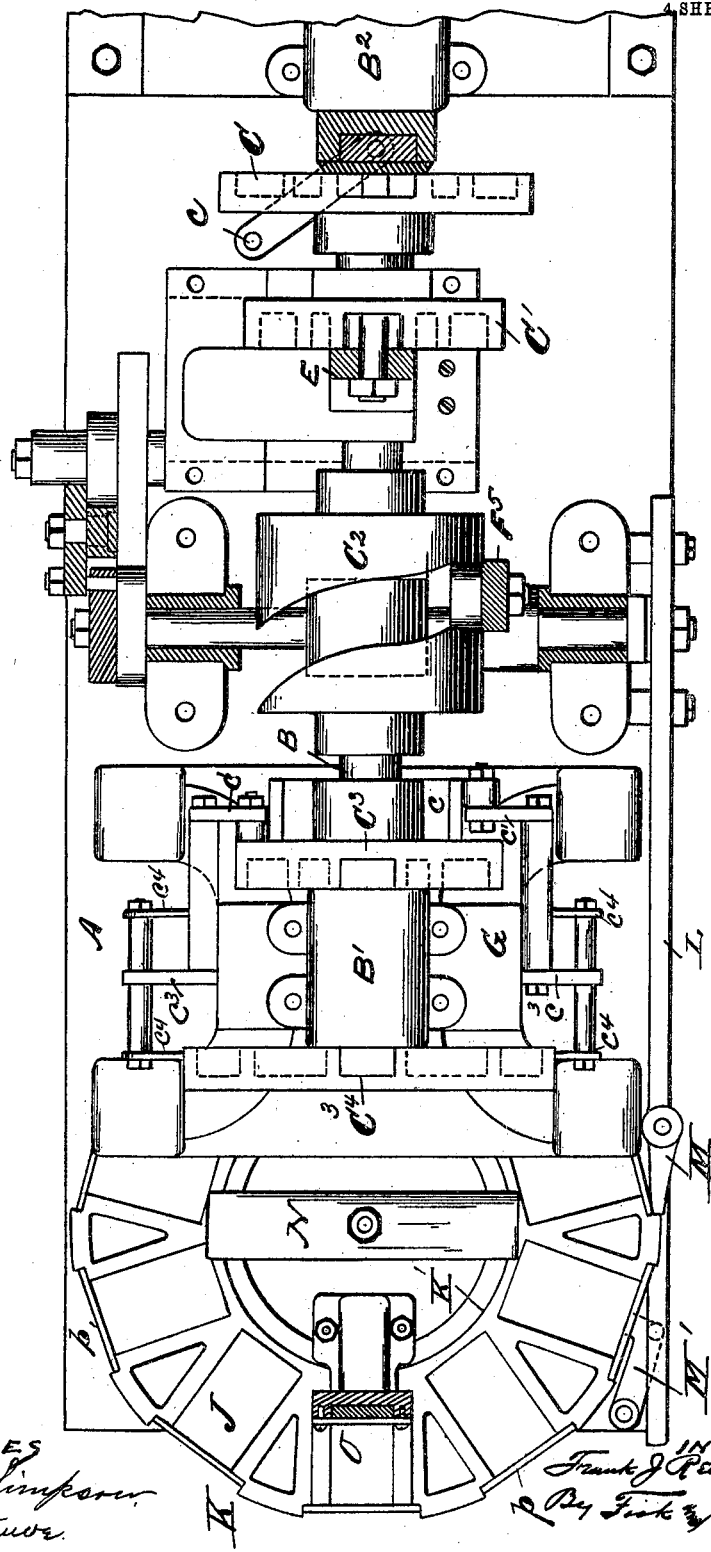

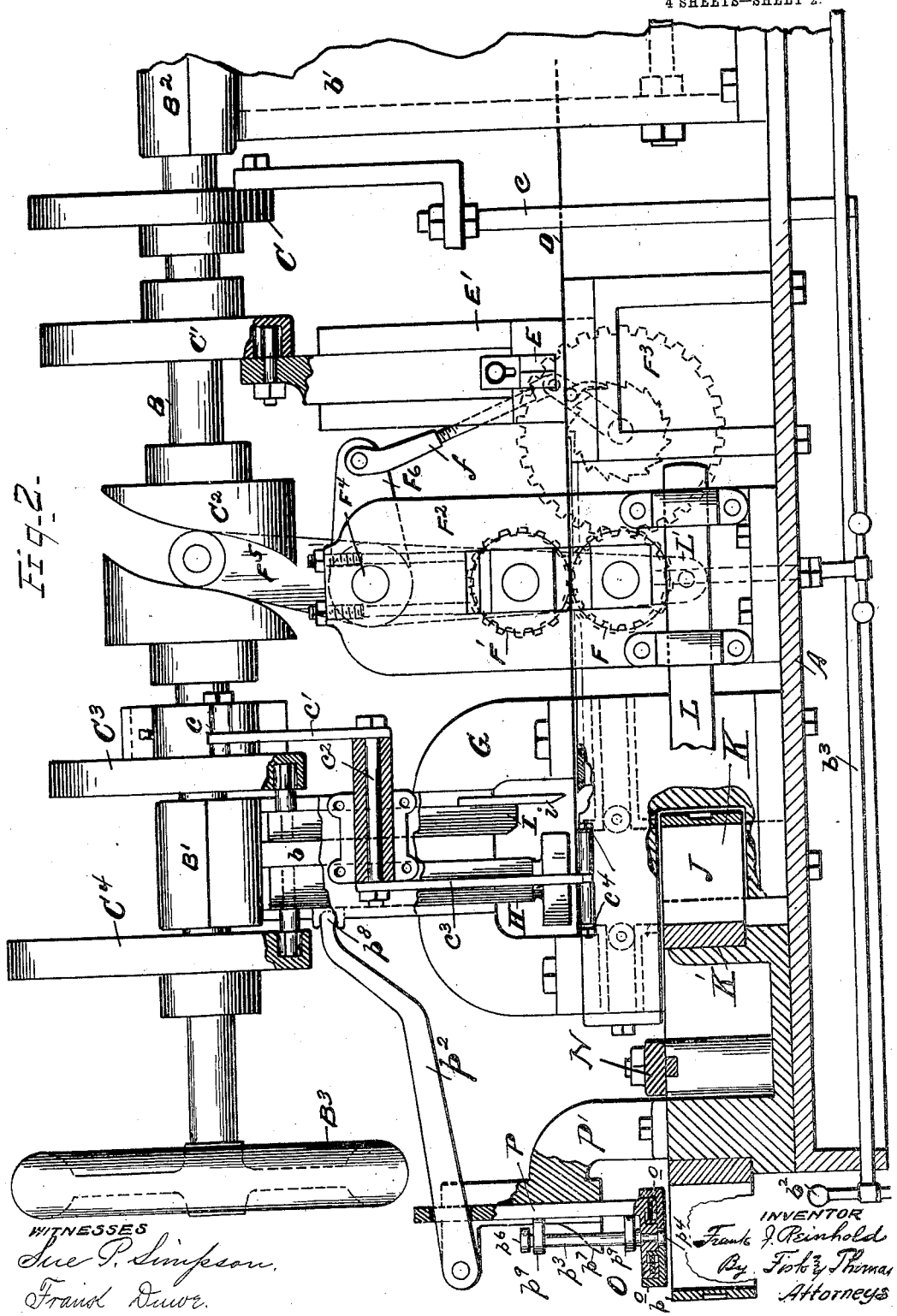

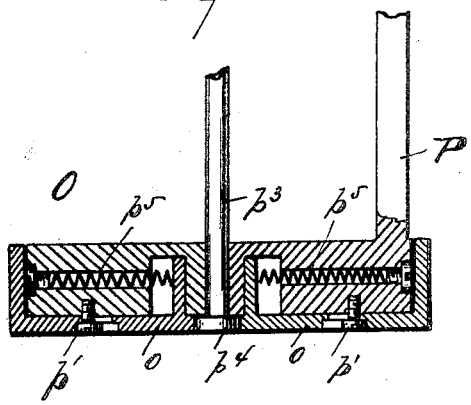
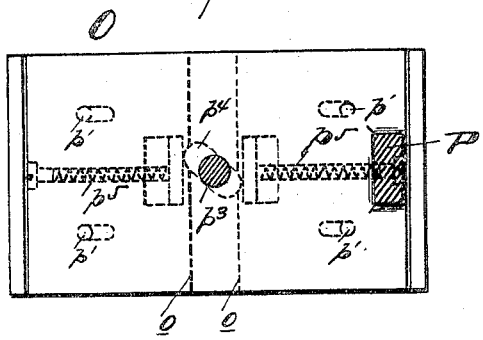

No. 822,301. PATENTED JUNE 5, 1906.
F. J. REINHOLD.
BOX MAKING MACHINE.
APPLICATION FILED DEC. 21, 1899.
4 SHEETS—SHEET 4.
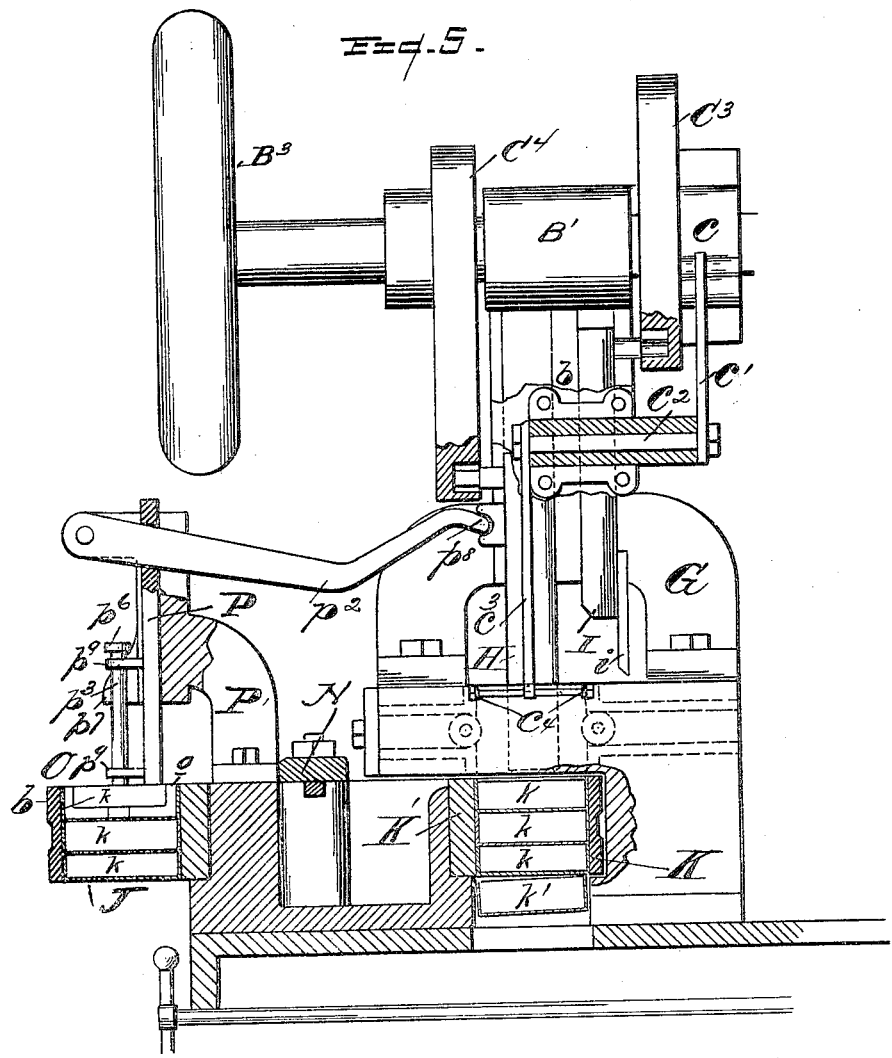
WITNESSES
Frank Snow
Rose Orr
INVENTOR
Frank J. Reinhold
By Fisk & Thomas
Attorneys

UNITED STATES PATENT OFFICE.

FRANK J. REINHOLD, OF DETROIT, MICHIGAN, ASSIGNOR, BY DIRECT AND MESNE ASSIGNMENTS, TO THE DIAMOND MATCH COMPANY, OF NEW YORK, N. Y., A CORPORATION OF ILLINOIS.

BOX-MAKING MACHINE.

No. 822,301.  Specification of Letters Patent.  Patented June 5, 1906.

Application filed December 21, 1899. Serial No. 741,146.

*To all whom it may concern:*

Be it known that I, FRANK J. REINHOLD, a citizen of the United States, residing at Detroit, county of Wayne, State of Michigan, have invented a certain new and useful Improvement in Box-Making Machines; and I declare the following to be a full, clear, and exact description of the invention, such as will enable others skilled in the art to which it pertains to make and use the same, reference being had to the accompanying drawings, which form a part of this specification.

My invention relates to improvements in machines for manufacturing paper boxes and is shown in the accompanying drawings, in which—

Figure 1 is a plan view. Fig. 2 is a side elevation, partly in section. Fig. 3 is a view showing details of the re-pressing device. Fig. 4 is a plan view of the same, partly in section. Fig. 5 is a sectional view showing the manner of inserting, re-pressing, and carrying the boxes in the wheel one over another in series.

In the drawings, A represents the table or bed of the machine, which may be supported upon any suitable standards. B is the main shaft of the machine, mounted in bearings $B'$ and $B^2$, the shaft being parallel with the table. The bearing $B^2$ is supported from the table on the vertical support $b'$, and the bearing $B'$ is supported on the vertical support $b$. The main shaft B is driven by any suitable means and is provided with the hand-wheel $B^3$ at the front of the machine to provide means for turning the shaft by hand in adjusting the machine. $b^3$ is a rod extending through underneath the bed and is provided at the front of the machine with a small hand-wheel $b^2$. This shaft operates the clutch mechanism at the rear of the machine, whereby the operator from in front can start or stop the same at will.

The machine is provided with the usual means for feeding paper or cardboard, for scoring it, for gluing it, and for cutting it off. The glue mechanism is underneath the machine and is not shown, except the cam C and the connecting-rod $c$. The paper travels on the line D and is first operated upon in the machine by the slitting device E, operating from cam $C'$. This device cuts two parallel slits in the paper at the point where it is to be cut off and in such a manner that the slits will extend an equal distance into each blank, leaving between the slits what is known as the "end" flaps and outside of the slits the "side" flaps. The slitting device moves up and down in the machine in guides formed in the standard $E'$.

The feeding device consists of the feeding-rolls F and $F'$, mounted in the vertical standard $F^2$. These rolls are geared together and are driven from the gear $F^3$, mounted in the standard $E'$.

$F^4$ is a transverse rock-shaft mounted in the standards $F^2$ and is rocked by means of the arm $F^5$ and the cam $C^2$.

$F^6$ is a horizontal arm attached to the rock-shaft $F^4$, the free end of which is caused to move up and down as the shaft is operated by the cam $C^2$.

$f$ is a connecting-rod operated by the arm $F^6$. The reciprocated movement of this connecting-rod is communicated to the driving gear-wheel $F^3$ through a ratchet mechanism in the usual manner, whereby the feeding-rolls are given the necessary intermittent movement for feeding the paper.

G is a supporting-frame that is bolted to the bed and that rises to a sufficient height to form the support for the bearing $B'$ and to serve as the guide for the former-plunger H, as well as the plunger I, bearing the knife $i$ for cutting off blanks.

The plunger I is operated by the cam $C^3$, and the former-plunger H is operated by the cam $C^4$. The means for cutting off the blank and for forming the box from the blank are quite similar to those employed heretofore in the art.

The cardboard is fed under the former-plunger by the operation of the feeding-rolls, and through the action of the cams the former-plunger and the knife move downward until the knife severs the blank from the sheet, after which the continued movement of the former-plunger forces the blank downward into a female die, folding up the side of the box, leaving the end flap extending in a horizontal direction and the side flaps standing in a vertical direction. As is common in this class of machines, the former-plunger rests a moment, while the folding-fingers $c^4$ move in to fold in the side flaps. These fingers are operated from the cam $c$ through the rock-arm $c'$, the rock-shaft $c^2$, and the arm $c^3$. After the side flaps are folded in the former-plunger continues its movement down into the female die, folding the end flaps up against the side flaps and plunger and then carrying the whole box downward into a pocket J, formed in a horizontal carrying-wheel K. This wheel is provided with a series of these pockets, preferably about ten in number, and the wheel itself is mounted on the hollow hub K'. The wheel proper is formed of one casting, the outer ends of the pockets being closed by the plates $p$. As the former-plunger forces one box into the pocket it forces the box already in the pocket downward to a lower position, and after the pockets are filled with boxes the entry of a new box in the top of the pocket discharges a completed box from the bottom.

L is a bar arranged to reciprocate along the side of the machine and is operated by the arm L', fixed to the shaft $F^4$. On the bar L is pivoted a dog M, which engages with the periphery of the wheel K as the bar is operated to move the wheel forward a sufficient distance to bring another pocket under the plunger. To the outer end of the bar L is pivoted a second dog M', which engages with the wheel to lock it when it is at the point of rest and during the time the former-plunger is forcing a box into one of the pockets of the wheel. N is a friction-plate arranged to be drawn down on the hub to increase the resistance to its movement.

O is a re-pressing device arranged to enter the pocket in the wheel that is directly opposite the one under the former-plunger. The purpose of this re-pressing device is to force the glued surfaces of the box a second time into close contact and at the time when the glue is partly set or beginning to set. The means I employ for accomplishing this result consists in an expanding plunger consisting of the opposite sections $o$ $o$, the two sections being held in operative relations on and by the pins $p'$ $p'$ and being normally drawn toward each other by the springs $p^5$ $p^5$. This expanding plunger is fixed to the plunger-rod P, and the rod are arranged to move up and down in a way formed in the standard P'. The plunger-rod and plunger are moved up and down simultaneously with the former-plunger by the lever $p^2$, the end of the lever being engaged with the former-plunger by a universal joint $p^8$. Extending out from the plunger-rod P are supports $p^9$ $p^9$, in which is mounted a vertical cam-rod $p^3$, provided with the cam $p^4$ at its lower end located between the sections of the expanding plunger.

The cam-rod $p^3$ is provided with an arm $p^6$, which travels along the surface of a cam $p^7$, fixed to the standard P', the construction being such that the cam-rod $p^3$ is given a part of a turn as it travels down, the rotation of the rod causing the cam $p^4$ to force the opposite sections of the plunger O apart and against the glued sections of the box.

One of the purposes of my invention is to reduce the size of the carrying-wheel without reducing the number of boxes it is capable of carrying. This I accomplish by using a wheel having only a small number of pockets and by making the pockets in the wheel of sufficient depth to carry two or more boxes. In using this construction I first operate the machine in the manner common to this class of machines until the wheel has made one complete circuit, when a second series of boxes is placed in the pockets over the first series, the box in each pocket being forced down as a new box enters. If the pockets are deep enough to carry, say, four boxes, then a wheel having but ten pockets will carry forty boxes before any are delivered. This gives the glue time to dry. This construction and use is illustrated in Fig. 5, in which two of the pockets in the wheel are shown, both filled with boxes, three boxes in each pocket.

$k$ $k$ represent the boxes in the pockets, and $k'$ the box being delivered from the pocket under the former-plunger by the insertion of the fourth box in the pocket by the former-plunger.

To more perfectly glue the boxes, I employ the re-pressing device, which operates upon the boxes in the pocket after the glue has partly dried or set. Those familiar with the use of glue will understand that the second operation of pressing the glued surfaces together will have the effect to cause the surfaces to adhere where the first operation may have failed. The result of this second or re-pressing is to form a stronger box and one of better form.

To provide for steadiness in the operation of the carrying-wheel, a friction device is used to prevent too much or too quick movement of the wheel. For this purpose I mount the wheel or carrying-rim upon a large hub, and in addition to the friction provided by the enlarged friction-surfaces I add a spring friction device.

I would also have it understood that in the use of the expanding plunger I do not limit myself to re-pressing devices alone, as the former-plunger may be made to expand to force the glued surfaces more closely into contact than can be conveniently done by forcing them through the folding devices. I use the term "expanding plunger;" but the pressing device may not be strictly a plunger in every case, and I do not desire to limit myself by the use of the term most adapted to describe the instrument used in the construction herein shown and described.

What I claim is—

1. In a box-making machine, the combination with slitting and cutting devices, plungers for the same, a former-plunger, a main shaft, and cams on said shaft arranged to act directly on all of the plungers, of a holder for the box, and a re-pressing device arranged to enter the holder for further acting upon the glued surfaces of the box therein.

2. In a box-making machine, the combination of a holder, means for forcing a blank into the holder to form it into a box, and a re-pressing device arranged to enter the holder and act upon the box therein after the withdrawal of the box-forming means.

3. In a box-making machine the combination of the forming mechanism, a carrier provided with a series of box-holders which constitute part of the box-forming mechanism, and a re-pressing device arranged to act upon the boxes while supported by the holders, said re-pressing device being apart from the forming mechanism and situated in the path of the series of box-holders in moving from the forming mechanism.

4. In a box-making machine, the combination of the forming mechanism, a carrier provided with a series of pockets or female dies, and a re-pressing device arranged to enter the pockets successively after the former-plunger has been withdrawn, substantially as described.

5. In a box-making machine, the combination of the former-plunger, the forming-dies, traveling pockets arranged to receive the boxes, and a re-pressing device arranged to enter the pockets, and re-press the glued surfaces of the boxes in the pockets after the glue has partially dried, and means for operating the former-plunger and re-pressing device simultaneously, substantially as described.

6. In a box-making machine, the combination of the former-plunger, the forming-dies, traveling pockets arranged to receive the boxes, and a re-pressing device arranged to enter the pockets and re-press the glued surfaces of the boxes in the pockets after the glue has partially dried, substantially as described.

7. In a box-making machine, the combination of the former-plunger, the former-dies, traveling pockets arranged to receive the boxes, a re-pressing device arranged to enter the pockets, and re-press the glued surfaces of the boxes in the pockets after the glue has partially dried, and means for operating the re-pressing device from the plunger, substantially as described.

8. In a box-making machine, the combination of the former-plunger, the former-die, traveling pockets arranged to receive the boxes, a re-pressing device arranged to enter the pockets and re-press the glued surfaces of the boxes in the pockets after the glue has partially dried, and a lever for operating the re-pressing device from the former-plunger, substantially as described.

9. In a box-making machine, the combination of the former-plunger, a carrying-wheel provided with pockets arranged to receive the boxes and a re-pressing device arranged to enter the pockets after the former-plunger is withdrawn, substantially as described.

10. In a box-making machine, the combination of the former-plunger, the carrying-wheel provided with pockets arranged to receive the boxes and an expanding plunger arranged to enter the pockets after the former-plunger is withdrawn, substantially as described.

11. In a box-making machine, the combination of a holder, means for forming boxes in said holder, a re-pressing device comprising a plunger movable into and out of the holder after the formation of the boxes therein, said plunger having a movable wall or walls, and a cam for moving said wall or walls operated by the movement of the plunger.

12. In a box-making machine, the former-plunger, the pockets, a re-pressing device consisting of an expanding plunger arranged to enter the pockets after the former-plunger is withdrawn, and means for expanding the same operated by the movement of the plunger, substantially as described.

13. In a box-making machine the former-plunger, traveling pockets arranged to receive the boxes, a re-pressing device arranged to enter the pockets after the former-plunger is withdrawn, and means for expanding the re-pressing device operated simultaneously with the movement of the device into the pocket, substantially as described.

14. In a box-making machine, the combination of the traveling pockets arranged to receive the boxes, a re-pressing plunger formed of two sections, the two sections having a movement relative to one another, and the cam between the sections for expanding the same, substantially as described.

15. In a box-making machine, the combination of a carrier provided with pockets, means for forming boxes in said pockets, and a re-pressing device comprising a plunger movable into and out of said pockets after the formation of the boxes therein, said plunger consisting of opposite movable sections, and a cam for expanding the sections operated by the movement of the plunger.

16. In a box-making machine, the combination of the expanding plunger for re-pressing the boxes, the standard for supporting the plunger, the cam-rod having parallel movement with the plunger, and the fixed cam arranged to act on the cam-rod operating the expanding-cam, substantially as described.

17. In a box-making machine, the combination of the expanding plunger, the plunger-rod, the cam for expanding the plunger, the cam-rod having parallel movement with the plunger-rod, and means for turning the cam-rod as the plunger is operated, substantially as described.

18. In a box-making machine the combination of a carrier provided with a series of pockets, each of a depth to hold two or more boxes at the same time, and means to coöperate with the pockets for forming boxes therein, said carrier being movable relatively to the forming means, whereby the formed boxes are successively placed in the pockets and successive layers of the boxes built up in the pockets before discharge of any of the boxes, the boxes being automatically discharged from the pockets when the latter are filled by the entry therein of a newly-formed box.

19. In a box-making machine the combination of a series of traveling pockets, each of a depth to contain two or more boxes at a time and means to coöperate with the pockets for forming boxes in the pockets one over another, said pockets being movable relatively to the forming means, whereby the formed boxes are successively placed in the pockets and successive layers of the boxes built up in the pockets before discharge of any of the boxes, the boxes being discharged from the pockets one at a time after the glue is set.

20. In a box-making machine, the combination of a holder, means for forming boxes therein, and a re-pressing device comprising an expanding plunger, means for normally holding it in a contracted condition, and means for expanding it, together with means for moving said plunger into and out of the holder after the formation of the boxes therein.

21. In a box-making machine, the combination of a holder, means for forming boxes therein, and a re-pressing device comprising an expanding plunger having movable sections, means for normally holding said sections inward, and means for forcing the sections outward, together with means for moving said plunger into and out of the holder after the formation of the boxes therein.

22. In a box-making machine, the combination of a holder, means for forming boxes therein, and a re-pressing device comprising an expanding plunger having movable sections, springs for drawing and holding said sections inward, and means for forcing the sections outward, together with means for moving said plunger into and out of the holder after the formation of the boxes therein.

23. A carrier for box-making machines, circular in form, and adapted for coöperation with former mechanism, said carrier having dies or pockets extending inward from the periphery, the two side and inner walls of the dies or pockets being integral with the carrier, and plates made separate from and attached to the periphery of the carrier to form the outer end walls of the dies or pockets, said dies or pockets supporting the boxes during the setting of the adhesive.

24. In a box-making machine a carrying-wheel adapted for coöperation with former mechanism and consisting of a rim, radial sections that project outward from the rim placed to provide pockets between the sections of uniform width, and plates attached to adjacent sections to form the outer walls of the pockets, said pockets supporting the boxes during the setting of the adhesive.

In testimony whereof I sign this specification in the presence of two witnesses.

FRANK J. REINHOLD.

Witnesses:
S. E. THOMAS,
FRANK DUWE.